(12) United States Patent
Chi et al.

(10) Patent No.: US 10,662,704 B2
(45) Date of Patent: May 26, 2020

(54) WINDOW WITH DISPLAY FUNCTION AND HOUSE USING THE SAME

(71) Applicants: Tsinghua University, Beijing (CN); HON HAI PRECISION INDUSTRY CO., LTD., New Taipei (TW)

(72) Inventors: Chin-Wei Chi, New Taipei (TW); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/121,814

(22) Filed: Sep. 5, 2018

(65) Prior Publication Data
US 2019/0112869 A1   Apr. 18, 2019

(30) Foreign Application Priority Data

Sep. 25, 2017 (CN) .......................... 2017 1 0875587

(51) Int. Cl.
| | |
|---|---|
| *E06B 7/28* | (2006.01) |
| *E06B 3/66* | (2006.01) |
| *G09G 3/34* | (2006.01) |
| *E06B 9/40* | (2006.01) |
| *B32B 17/10* | (2006.01) |
| *G06F 3/044* | (2006.01) |

(Continued)

(52) U.S. Cl.
CPC .......... *E06B 7/28* (2013.01); *B32B 17/10036* (2013.01); *E06B 3/6612* (2013.01); *E06B 9/40* (2013.01); *G06F 3/044* (2013.01); *G09G 3/20* (2013.01); *G09G 3/3453* (2013.01); *B32B 2419/00* (2013.01); *B32B 2457/208* (2013.01); *E06B 2009/2417* (2013.01); *G06F 3/045* (2013.01); *G06F 3/0416* (2013.01); *G06F 2203/04102* (2013.01); *G09G 3/3208* (2013.01); *G09G 3/344* (2013.01); *G09G 2370/02* (2013.01); *G09G 2370/16* (2013.01); *G09G 2380/02* (2013.01)

(58) Field of Classification Search
CPC . E06B 7/28; E06B 9/40; E06B 3/6612; E06B 2009/2417; B32B 17/10036; G06F 3/044
See application file for complete search history.

(56) References Cited

U.S. PATENT DOCUMENTS

| | | | |
|---|---|---|---|
| 6,429,961 B1 * | 8/2002 | Harary | B32B 17/10055 359/265 |
| 7,426,804 B2 * | 9/2008 | Pylkki | E06B 7/28 348/E5.13 |

(Continued)

FOREIGN PATENT DOCUMENTS

| | | |
|---|---|---|
| CN | 201883912 | 6/2011 |
| CN | 102289323 A | 12/2011 |

(Continued)

*Primary Examiner* — Paolo Agudelo
(74) *Attorney, Agent, or Firm* — ScienBiziP, P.C.

(57) ABSTRACT

A window with display function includes a window frame, a window body embedded in the window frame, a flexible display screen, an electronic element. The window body includes a first glass layer and a second glass layer spaced from each other. The flexible display screen is between the first glass layer and the second glass layer. A house using the window is also related.

14 Claims, 9 Drawing Sheets

(51) Int. Cl.
  *G09G 3/20*   (2006.01)
  *G06F 3/041*   (2006.01)
  *G09G 3/3208*   (2016.01)
  *G06F 3/045*   (2006.01)
  *E06B 9/24*   (2006.01)

(56)         References Cited

U.S. PATENT DOCUMENTS

| | | | |
|---|---|---|---|
| 9,052,563 B2 | 6/2015 | Fan et al. | |
| 2007/0277937 A1* | 12/2007 | Su | E06B 9/264 160/98 |
| 2011/0109831 A1* | 5/2011 | Chen | G02F 1/133308 349/58 |
| 2012/0053731 A1* | 3/2012 | Feldstein | E06B 9/42 700/275 |
| 2013/0330495 A1* | 12/2013 | Maatta | B23P 11/00 428/68 |
| 2014/0268532 A1* | 9/2014 | Nicol | G09F 9/301 361/679.26 |
| 2015/0198366 A1* | 7/2015 | Sanders | F21V 29/70 362/253 |
| 2015/0293634 A1* | 10/2015 | Her | G06F 3/044 345/174 |
| 2015/0330138 A1* | 11/2015 | Staton | E06B 3/68 52/173.1 |
| 2015/0370140 A1* | 12/2015 | Bertolini | B32B 17/10036 359/275 |
| 2016/0041679 A1* | 2/2016 | Ahn | G06F 3/044 345/173 |
| 2017/0236458 A1* | 8/2017 | Kim | E06B 7/00 52/31 |
| 2018/0239156 A1* | 8/2018 | Staton | G02B 27/144 |

FOREIGN PATENT DOCUMENTS

| | | |
|---|---|---|
| CN | 205063717 U | 3/2016 |
| CN | 106988661 | 7/2017 |

* cited by examiner

WINDOW WITH DISPLAY FUNCTION AND HOUSE USING THE SAME

FIELD

The present application relates to a window with display function and a house using the window with display function.

BACKGROUND

The window generally includes a window frame and a window body, and the window body includes at least one glass layer embedded in the window frame. According to needs, the window body may be fixed in the window frame, or may be horizontally slid or pushed back and forth. People often use windows as a means of lighting the house, so what is the scenery outside of the window and what kind of scenery people see. Sometimes the scenery outside of the window is not what people like, affecting mood.

What is needed, therefore, is to provide a window with display function and a house using the window that can overcome the above-described shortcomings.

Therefore, there is room for improvement in the art.

BRIEF DESCRIPTION OF THE DRAWINGS

Implementations of the present technology will now be described, by way of example only, with reference to the attached figures, wherein.

DETAILED DESCRIPTION

Figure 1:
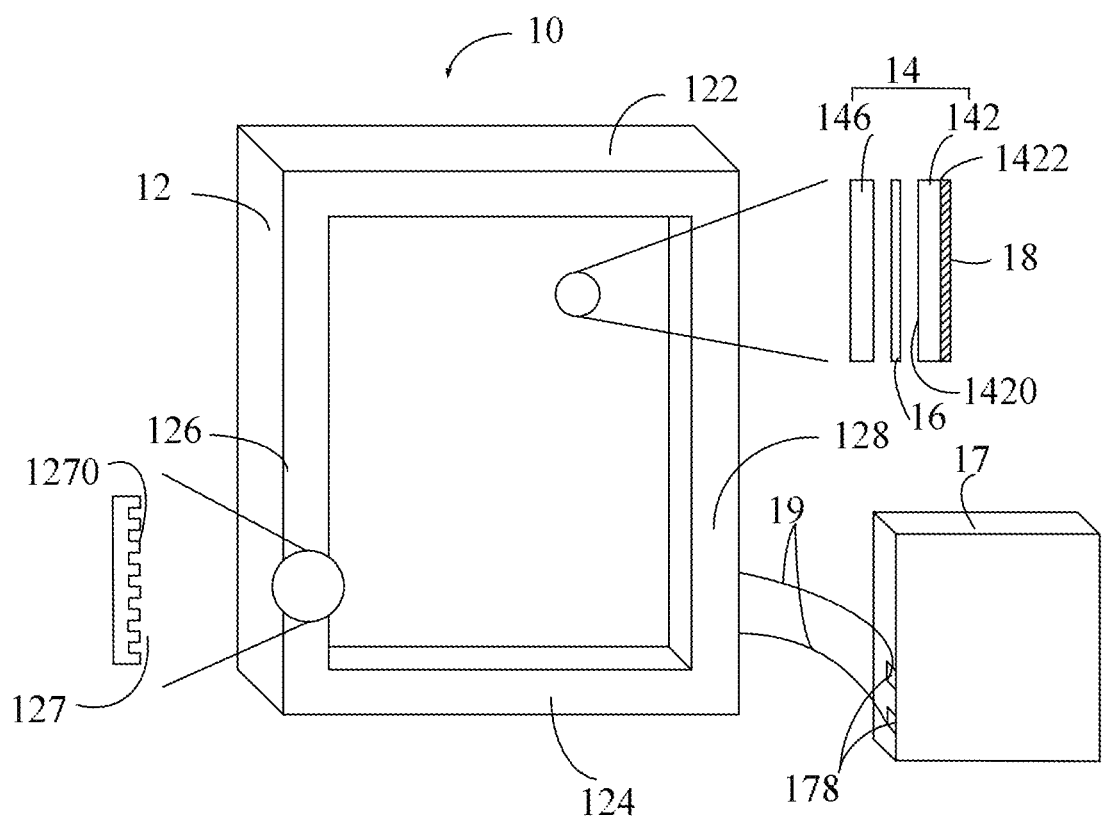
FIG. 1 is a schematic view of a first embodiment of a window with display function.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated to illustrate details and features better. The description is not to be considered as limiting the scope of the embodiments described herein.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Referring to FIG. 1, a window with display function 10 in a first embodiment includes a window frame 12, a window body 14 located in the window frame 12, a flexible display screen 16, and an electronic element 17. The window body 14 includes a first glass layer 142 and a second glass layer 146 stacked with and spaced from each other. The flexible display screen 16 is between the first glass layer 142 and the second glass layer 146.

The window frame 12 includes a first strip structure 122 and a second strip structure 124 opposite to the first strip structure 122, and a third strip structure 126 and a fourth strip structure 128 opposite to the third strip structure 126. The first strip structure 122 is connected to the third strip structure 126 and the fourth strip structure 128, and the second strip structure 124 is also connected to the third strip structure 126 and the fourth strip structure 128, so that the continuous window frame 12 is formed. The material of the window frame 12 is not limited, and can be a wood, a polymer, a metal, or the like. The metal can be a pure metal or an alloy.

The first glass layer 142 has an inner surface 1420 and an outer surface 1422 opposite to the inner surface 1420. The inner surface 1420 and the outer surface 1422 are defined according to the positional relationship between the first glass layer 142 and the second glass layer 146. The inner surface 1420 refers to a surface of the first glass layer 142 near to the second glass layer 146, and the outer surface 1422 refers to a surface of the first glass layer 142 away from the second glass layer 146. The first glass layer 142 and the second glass layer 146 are used to protect the flexible display screen 16. The first glass layer 142 and the second glass layer 146 can be embedded into the window frame 12, and the window body 14 cannot move. The space between the first glass layer 142 and the second glass layer 146 can be evacuated or filled with an inert gas.

Figure 2:
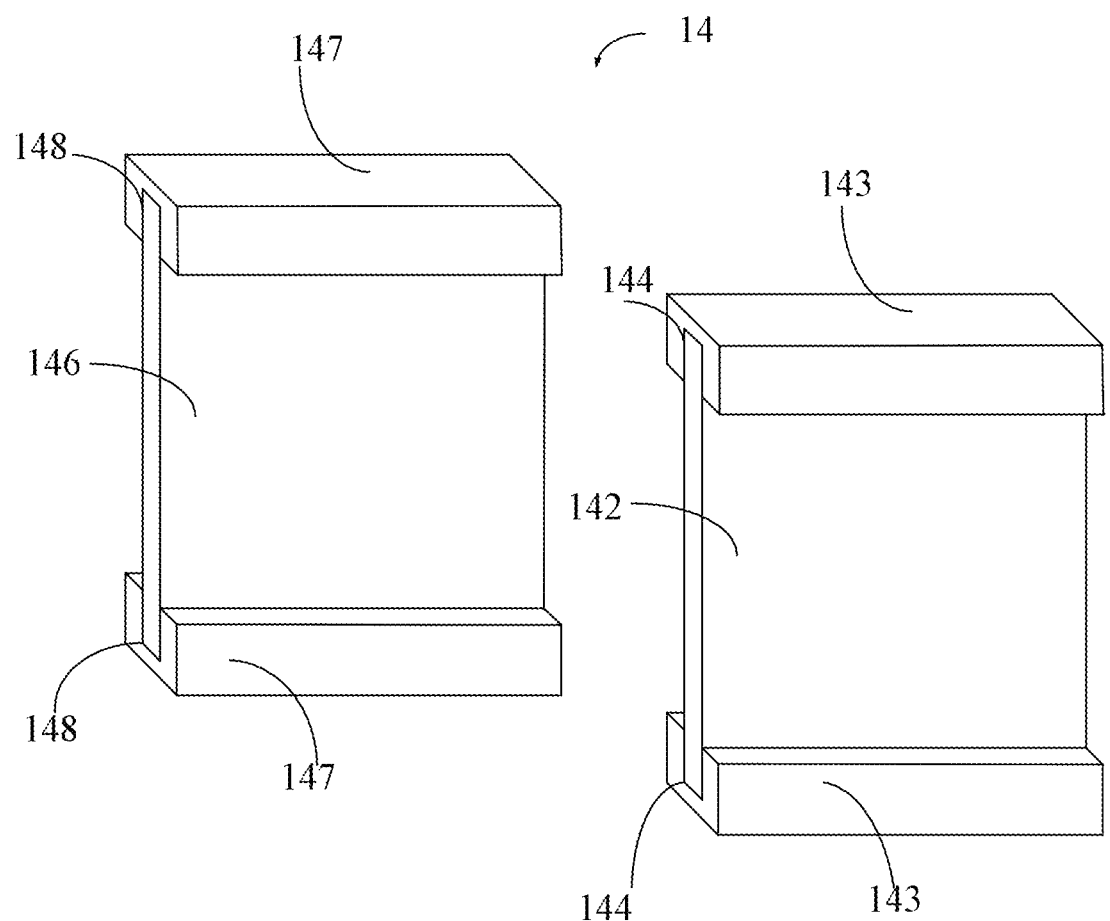
FIG. 2 is a schematic view of a window body of the window with display function of FIG. 1.
Figure 3:
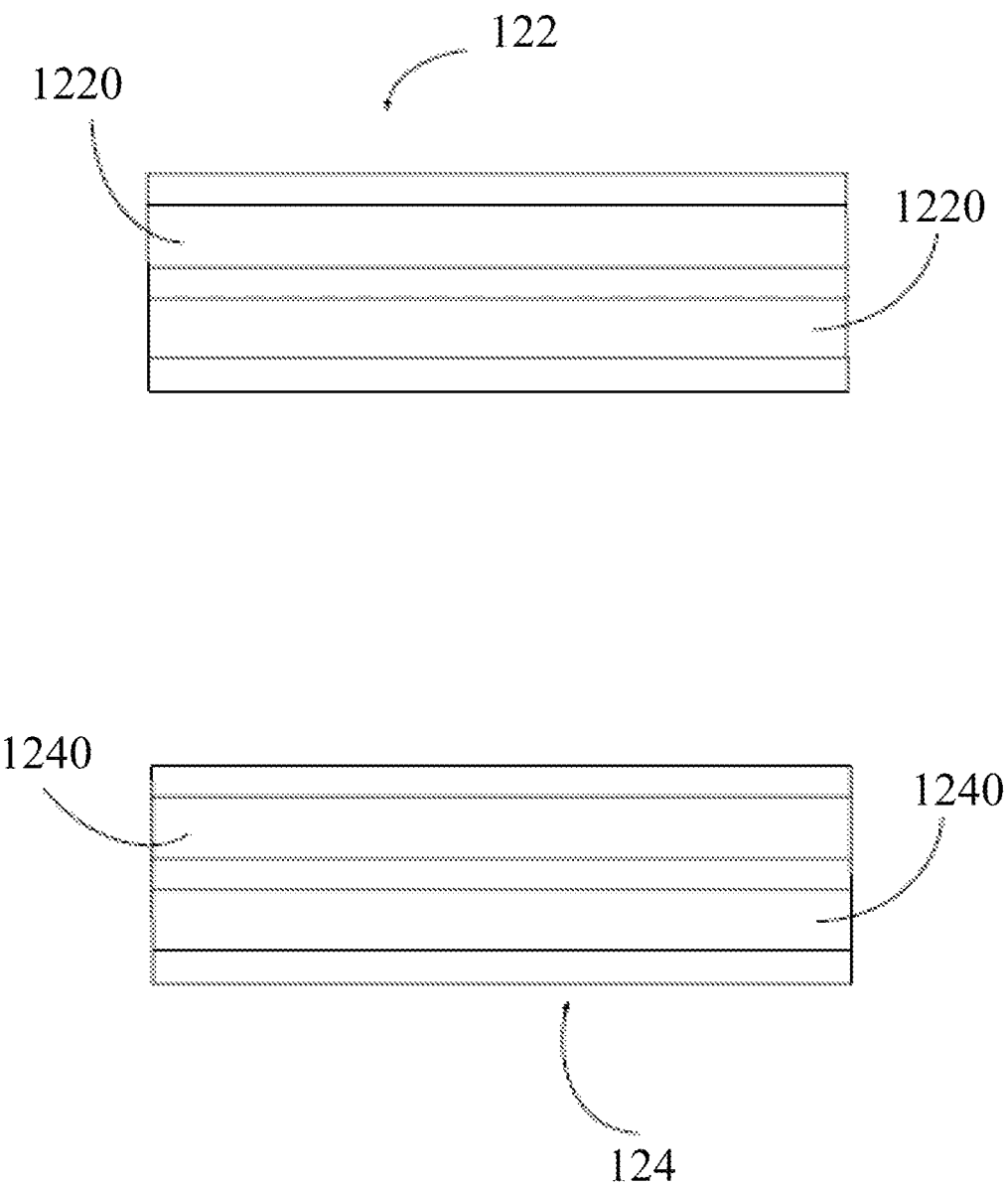
FIG. 3 is a schematic view of a first strip structure and a second strip structure of the window with display function of FIG. 1.

The window body 14 can also be moved in the window frame 12 to achieve interior ventilation. Referring to FIG. 2, the window body 14 further includes two first connecting frames 143 opposite to each other and two second connecting frames 147 opposite to each other. Each first connecting frames 143 defines a first groove 144, and each second connecting frame 147 defines a second groove 148. The first glass layer 142 is embedded in the first grooves 144 of two opposite first connecting frames 143. The second glass layer 146 is embedded in the second grooves 148 of two opposite second connecting frames 147. Referring to FIG. 3, the inner wall of the first strip structure 122 defines two third grooves 1220 spaced from and parallel to each other, and the inner wall of the second strip structure 124 defines two fourth grooves 1240 spaced from and parallel to each other. The first connecting frame 143 is embedded into the third groove 1220 and the fourth groove 1240, and this third groove 1220 and this fourth groove 1240 are opposite to each other. The second connecting frame 147 is embedded into another third groove 1220 and another fourth groove 1240, and this third groove 1220 and this fourth groove 1240 are opposite to each other. The first connecting frame 143 and the second connecting frame 147 can move in the third groove 1220 and the fourth groove 1240. The second glass layer 146 and the flexible display screen 16 can be fixed, and only the first glass layer 142 moves in the third groove 1220 and the fourth groove 1240.

Optionally, the first glass layer 142, the second glass layer 146, and the flexible display screen 16 can be fixed as a whole in the window frame 12. The whole formed by the first glass layer 142, the second glass layer 146, and the flexible display screen 16 can move in the window frame 12. When the first glass layer 142, the second glass layer 146, and the flexible display screen 16 are integrated, the space between the first glass layer 142 and the second glass layer 146 can also be evacuated or filed with the inert gas.

Figure 4:
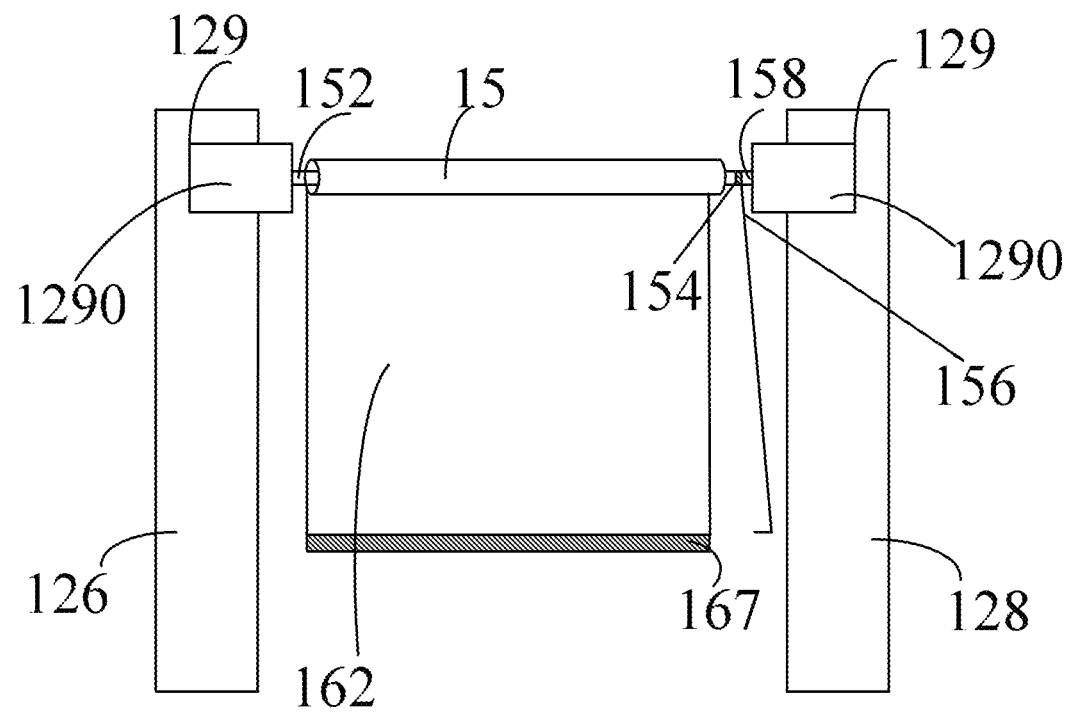
FIG. 4 is a schematic view of the first embodiment of connecting a window frame and a flexible display screen.

The flexible display screen 16 can be used for displaying images or function as a curtain. Referring to FIG. 4, the flexible display screen 16 can be located between the first glass layer 142 and the second glass layer 146 by a support rod 15. The support rod 15 includes a first convex body 152, a second convex body 158 opposite to the first convex body 152, and a middle portion between the first convex body 152 and the second convex body 158. The shapes of the first convex body 152 and the second convex body 158 can be round, and the diameters of the first convex body 152 and the second convex body 158 can be less than the diameter of the middle portion. The third strip structure 126 and the fourth strip structure 128 have a hole 129, and the hole 129 of the third strip structure 126 and the hole 129 of the fourth strip structure 128 are opposite to each other. A holding frame 1290 is located in the hole 129 of the third strip structure 126, and the first convex body 152 is embedded into the holding frame 1290. Another holding frame 1290 is located in the hole 129 of the fourth strip structure 128, and the second convex body 158 is embedded into the holding frame 1290. The holding frame 1290 is used for supporting the support rod 15.

The window 10 can further include a pulley 154 and a slide rope 156 located on the pulley 154. The pulley 154 is fixed on the first convex body 152 or the second convex body 158, so that the support rod 15 rotates together with the pulley 154. The pulley 154 and the slide rope 156 can used to control the unfolding and the curling of the flexible display screen 16. A weight plate 167 can be connected to the flexible display screen 16, and the weight plate 167 is below the flexible display screen 16. The weight plate 167 is used to prevent the flexible display screen 16 from bending and shaking when being deployed. Furthermore, the third strip structure 126 and the fourth strip structure 128 can include a guide groove 127, and the guide groove 127 of the third strip structure 126 and the guide groove 127 of the fourth strip structure 128 are opposite to each other. The guide groove 127 includes a plurality of convex structures 1270 spaced from each other. The flexible display screen 16 is fixed in the guide groove 127 by the plurality of convex structures 1270. The plurality of convex structures 1270 are used to prevent the flexible display screen 16 from bending and shaking when being deployed. The flexible display screen 16 can move through the plurality of convex structures 1270 in the guide groove 127.

Figure 5:
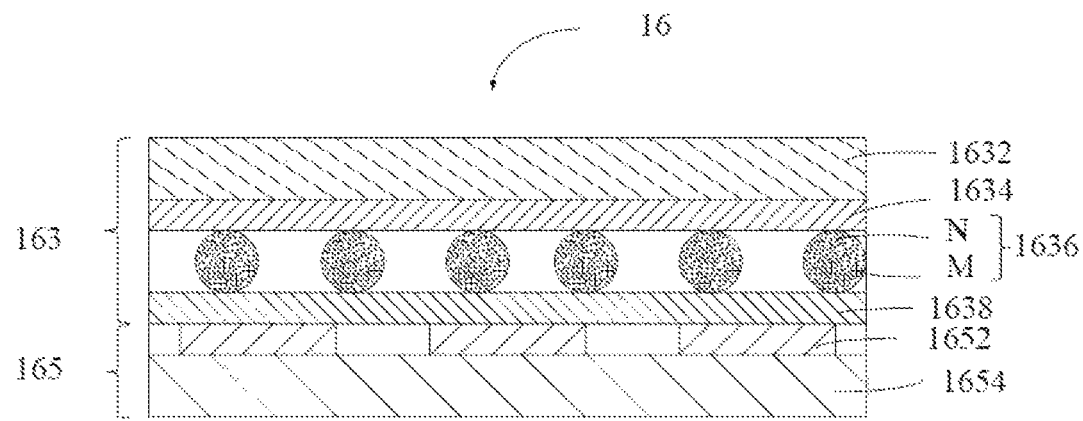
FIG. 5 is a schematic view of the first embodiment of the flexible display screen.

The flexible display screen 16 can be an organic light emitting diode (OLED) display screen or an electrophoretic display screen. In one embodiment, the flexible display screen 16 is the electrophoretic display screen. Referring to FIG. 5, the flexible display screen 16 includes an electronic paper 163 and a drive panel 165 stacked with the electronic paper 163. The electronic paper 163 is a micro-capsule type electronic paper, a micro-cup structure type electronic paper or an electronic power flow type electronic paper. In one embodiment, the electronic paper 163 is the micro-capsule type electronic paper, and includes a first substrate 1632, a counter electrode 1634, a plurality of microcapsules 1636, and a second substrate 1638.

The first substrate 1632 and the second substrate 1638 are stacked with and spaced from each other. The counter electrode 1634 is located on a surface of the first substrate 1632 near to the second substrate 1638. The plurality of microcapsules 1636 is between the counter electrode 1634 and the second substrate 1638. Each of the plurality of microcapsules 1636 includes a medium solution N and a plurality of shallow pigment particles M with charge.

The drive panel 165 includes a base 1654 and a plurality of pixel electrodes 1652 spaced from each other. The plurality of pixel electrodes 1652 is located on a surface of the base 1654 near to the electronic paper 163. The plurality of pixel electrodes 1652 is between the second substrate 1638 and the base 1654. The plurality of pixel electrodes 1652 are in one-to-one correspondence with the plurality of microcapsules 1636. The materials of the base 1654, the first substrate 1632 and the second substrate 1638 are a transparent flexible material, such as polymer. The polymer can be plastic or resin, such as polyethylene terephthalate (PET). The plurality of pixel electrodes 1652 can be thin film transistor pixel electrodes.

The electronic element 17 is electrically connected to the flexible display screen 16. The electronic element 17 is used to make the flexible display screen 16 display. The flexible display screen 16 displays images input by the electronic element 17. The electronic element 17 can be a microcomputer installed in the window frame 12 and integrated with the window with display function 10. The electronic element 17 can also be separate from the window frame 12, the window body 14, and the flexible display screen 16. The electronic element 17 is connected to the flexible display screen 16 by a data line 19. The electronic element 17 can be one of a computer a television, a mobile phone, a PDA, and other portable electronic products. In one embodiment, the electronic element 17 is separate from the window frame 12, the window body 14, and the flexible display screen 16, and connected to the flexible display screen 16 by the data line 19. In one embodiment, the images displayed by the flexible display screen 16 is controlled by a remote controller. The electronic element 17 can be omitted, and the flexible display screen 16 only functions as the curtain.

Figure 6:
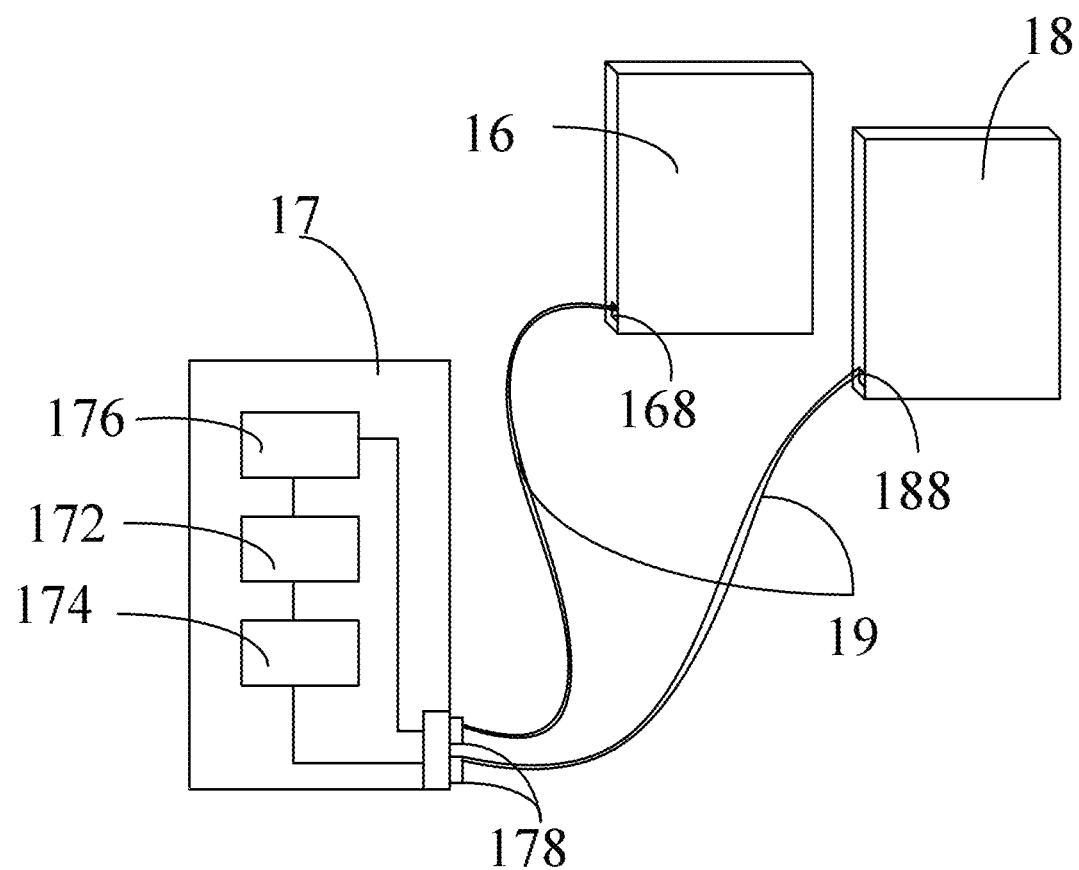
FIG. 6 is a schematic view of a second embodiment of connecting the flexible display screen, a touch panel, and an electronic element.

An window with display function of a second embodiment is provided. Referring to FIG. 6, the window with display function is similar to the window with display function 10 above except that the window with display function further includes a touch panel 18, and the images displayed by the flexible display screen 16 is controlled by a touch method.

The touch panel 18 is used to detect the user's touch signal and send the signal to the electronic element 17. The electronic element 17 includes a control unit used for controlling the flexible display screen 16 and the touch panel 18, and a process unit for processing the signal. The flexible display screen 16 can be integrated with the touch panel 18. The flexible display screen 16 can be separated from the touch panel 18, and electrically connected to the electronic element 17. In one embodiment, the flexible display screen 16 is separated from the touch panel 18 and electrically connected to the electronic element 17.

Referring to FIG. 6, the flexible display screen 16 includes a first data line port 168, the electronic element 17 includes a second data line port 178, and the touch panel 18 includes a third data line port 188. The electronic element 17 includes a central processing unit 172, a touch panel control module 174, and a display screen control module 176. The flexible display screen 16 and the touch panel 18 are electrically connected to the electronic element 17 by data lines 19 so as to obtain a driving signal and send a control signal and a sensing signal.

The counter electrode 1634 of the flexible display screen 16 is connected to first data line port 168 by a circuit, so that the counter electrode 1634 is electrically connected to the display screen control module 176 by the date line 19 between the first data line port 168 and the second data line port 178. The plurality of pixel electrodes 1652 is electrically connected to the first data line port 168 by the circuit, so that the plurality of pixel electrodes 1652 is electrically connected to the display screen control module 176 by the date line 19 between the first data line port 168 and the second data line port 178.

Figure 7:
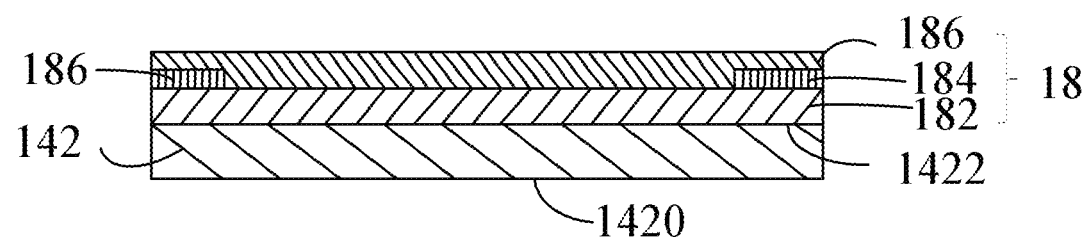
FIG. 7 is a schematic view of the second embodiment of the touch panel located on an outer surface of a first glass layer.

The touch panel 18 can be located on the outer surface 1422 of the first glass layer 142, as shown in FIG. 7. The touch panel 18 can be a capacitive touch panel, a resistive touch panel, or other types of touch panel. In one embodiment, the touch panel 18 is a surface-capacitive touch panel. The touch panel 18 includes a transparent conductive layer 182, at least two electrodes 184, and a protective layer 186. The transparent conductive layer 182 is located on a surface of the first glass layer 142 near to the interior of a room. The at least two electrodes 184 are located on two opposite sides or corners of the transparent conductive layer 182. The at least two electrodes 184 are electrically connected to the transparent conductive layer 182 for forming an equipotential surface on the transparent conductive layer 182. The protective layer 186 is located on a surface of the transparent conductive layer 182 away from the first glass layer 142, and used to protect the transparent conductive layer 182. Furthermore, the protective layer 186 covers the transparent conductive layer 182 and the electrodes 184.

Each electrode 184 has a first end and a second end opposite to the first end, the first end is electrically connected to the transparent conductive layer 182, and the second end is electrically connected to the third data line port 188. Thus the transparent conductive layer 182 can electrically connected to the touch panel control module 174 by the data line 19 between the third data line port 188 and the second data line port 178. In one embodiment, the transparent conductive layer 182 has two opposite sides, one electrodes 184 is located on one side of the transparent conductive layer 182, and another electrode 184 is located on another side of the transparent conductive layer 182.

The transparent conductive layer 182 can be a carbon nanotube layer or an indium tin oxide (ITO) layer. The carbon nanotube layer can be a pure carbon nanotube structure or a carbon nanotube composite structure. In one embodiment, the transparent conductive layer 182 is a pure carbon nanotube film. The material of the protective layer 186 can be silicon nitride, silicon oxide, benzocyclobutene (BCB), polyester, PET, or acrylic. The protective layer 186 can also be used to provide some other additional functions, such as reducing glare or reducing reflection. In one embodiment, the protective layer 186 is a PET film.

Figure 8:
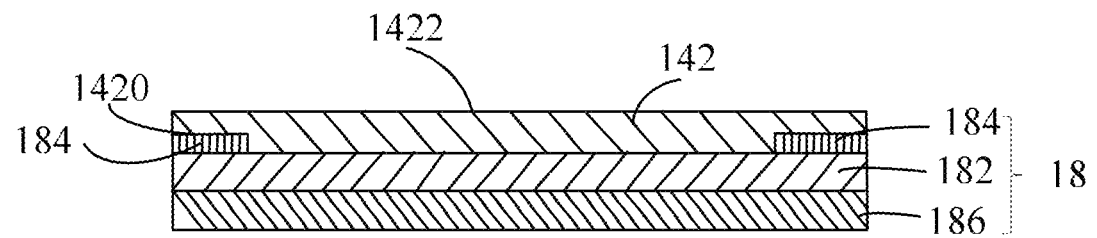
FIG. 8 is a schematic view of the second embodiment of the touch panel located on an inner surface of the first glass layer.

Referring to FIG. 8, the touch panel 18 can be located on the inner surface 1420 of the first glass layer 142. The transparent conductive layer 182 is located on the inner surface 1420. The at least two electrodes 184 are electrically connected to the transparent conductive layer 182 for forming an equipotential surface on the transparent conductive layer 182. The protective layer 186 can be located on a surface of the transparent conductive layer 182 away from the inner surface 1420. The touch panel 18 is located between the first glass layer 142 and the second glass layer 146, and the first glass layer 142 can simultaneously serve to support and protect the touch panel 18. Thus, the protective layer 186 can be omitted. In one embodiment, two electrodes 184 are spaced from each other, and between the inner surface 1420 and the transparent conductive layer 182; and the two electrodes 184 directly contact with the inner surface 1420 and the transparent conductive layer 182, as shown in FIG. 8.

A transparent substrate can be between the first glass layer 142 and the transparent conductive layer 182, and used for supporting the transparent conductive layer 182. The transparent substrate is flexible, and the material of the transparent substrate can be polycarbonate (PC), polymethyl methacrylate (PMMA), polyester, PET, polyether sulfone (PES), cellulose ester, BCB, polyvinyl chloride (PVC), or acrylic resins. The transparent substrate can be omitted.

In use, the flexible display screen 16 and the touch panel 18 are electrically connected to the electronic element 17 by the data lines 19. The touch panel 18 is touched to form a touch signal. The touch panel control module 174 senses the touch signal, calculates the coordinate information of the touch point on the touch panel 18, and sends the coordinate information to the CPU 172. The CPU 172 forms a information data or image data according to the coordinate information, and sends the information data or image data to the display screen control module 176. The display screen control module 176 receives the information data or image data, and display the information or images on the electronic paper 163.

The electronic element 17 further includes a network cable interface for receiving network signal so that the flexible display screen 16 displays images. Alternatively, a WIFI signal receiving module is located in the electronic element 17 to receive the network signal so that the flexible display screen 16 displays images.

Figure 9:
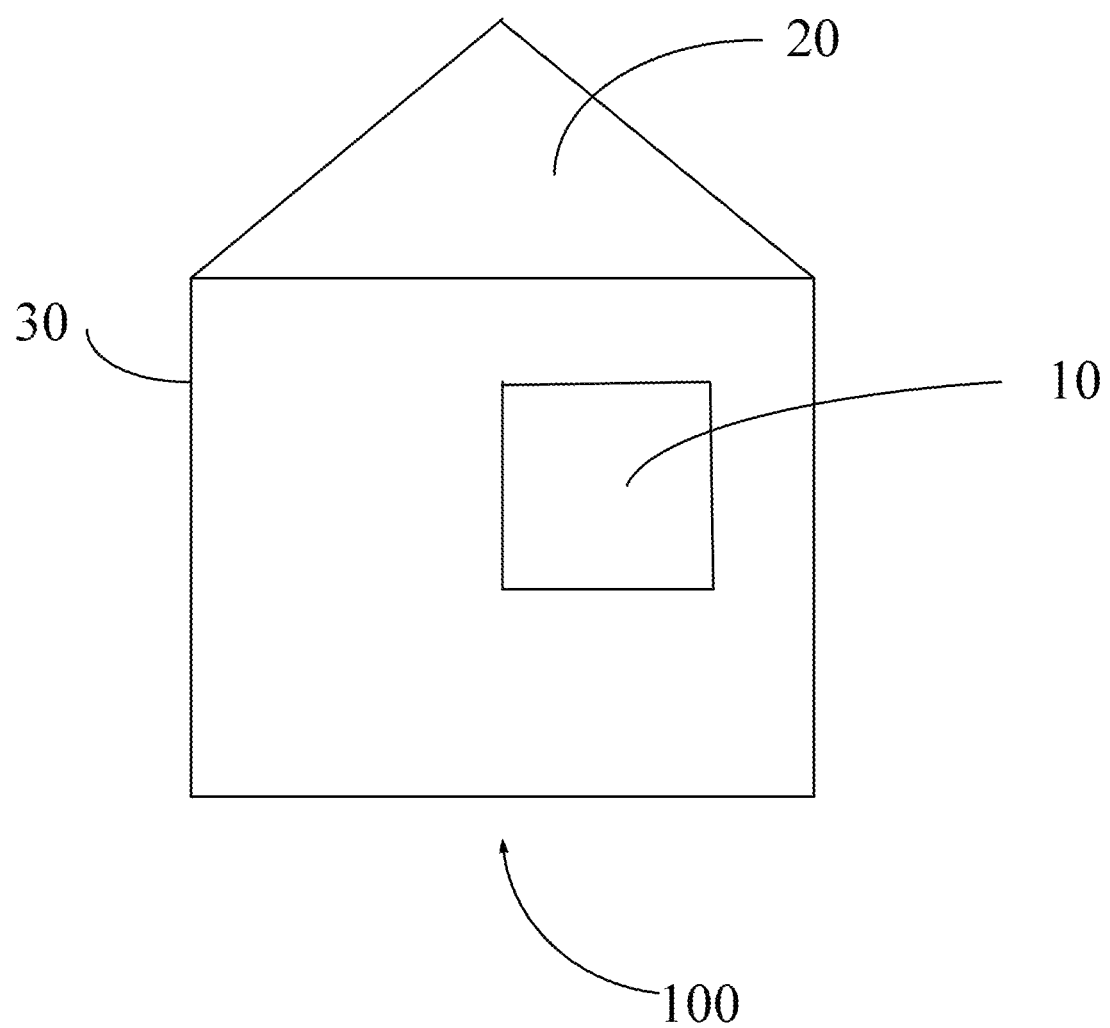
FIG. 9 is a schematic view of a third embodiment of a house using the window with display function.

Referring to FIG. 9, a house 100 of a third embodiment includes a roof 20, a wall 30, and the window with display function 10.

Compared with the prior art, the scenery seen by people through the window with display function 10 is not limited to the external environment.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

Additionally, it is also to be understood that the above description and the claims drawn to a method may comprise some indication in reference to certain steps. However, the indication used is only to be viewed for identification purposes and not as a suggestion as to an order for the steps.

What is claimed is:

1. A window with display function comprising:
   a window frame;
   a window body embedded in the window frame, wherein the window body comprises a first glass layer and a second glass layer spaced from each other;
   a flexible display screen located between the first glass layer and the second glass layer by a support rod, wherein the support rod comprises a first convex body and a second convex body opposite to the first convex body, and the first convex body and the second convex body are fixed on the window frame; and the flexible display screen being adapted for displaying images, wherein the flexible display screen is an organic light emitting diode display screen or an electrophoretic display screen; and
   an electronic element electrically connected to the flexible display screen and configured to input the images to the flexible display screen for displaying.

2. The window with display function of claim 1, further comprises a touch panel.

3. The window with display function of claim 2, wherein the touch panel is located on a surface of the first glass layer away from the second glass layer.

4. The window with display function of claim 2, wherein the touch panel is located on a surface of the first glass layer near to the second glass layer.

5. The window with display function of claim 1, wherein the first glass layer is moveable in the window frame.

6. The window with display function of claim 1, wherein a space between the first glass layer and the second glass layer is evacuated or filled with an inert gas.

7. The window with display function of claim 1, wherein the electronic element is located in the window frame.

8. The window with display function of claim 1, further comprising a weight plate connected to the flexible display screen.

9. The window with display function of claim 8, wherein the weight plate is below the flexible display screen.

10. The window with display function of claim 1, further comprises a pulley and a slide rope located on the pulley, the pulley is fixed on the first convex body or the second convex body, so that the support rod rotates together with the pulley.

11. The window with display function of claim 1, wherein the flexible display screen is an electrophoretic display screen comprising an electronic paper and a drive panel stacked with the electronic paper; the electronic paper comprises a first substrate, a counter electrode, a plurality of microcapsules, and a second substrate opposite to the first substrate; and the counter electrode and the plurality of microcapsules are between the first substrate and the second substrate.

12. The window with display function of claim 1, wherein the electronic element is a computer, a television, a mobile phone, or a personal digital assistant (PDA).

13. The window with display function of claim 1, further comprises a touch panel, wherein the electronic element comprises a central processing unit, a touch panel control module adapted for controlling the touch panel, and a display screen control module adapted for controlling the flexible display screen.

14. The window with display function of claim 1, further comprises a touch panel integrated with the flexible display screen.

* * * * *